(12) United States Patent
Loth

(10) Patent No.: US 6,304,035 B1
(45) Date of Patent: Oct. 16, 2001

(54) METHOD AND DEVICE FOR AUTOMATICALLY OPERATING THE LIGHTS OF A MOTOR VEHICLE

(75) Inventor: Siri Yuth Loth, Saint Brice sous Foret (FR)

(73) Assignees: Automobiles Peugeot, Paris; Automobiles Citroen, Neuilly sur Seine, both of (FR)

( * ) Notice: Subject to any disclaimer, the term of this patent is extended or adjusted under 35 U.S.C. 154(b) by 0 days.

(21) Appl. No.: 09/451,923

(22) Filed: Dec. 1, 1999

(30) Foreign Application Priority Data

Dec. 2, 1998 (FR) .................................................. 98 15233

(51) Int. Cl.$^7$ .................................................. H05B 39/00
(52) U.S. Cl. .......................... 315/82; 315/149; 315/158; 315/159; 307/10.8
(58) Field of Search ............................. 315/82, 149, 158, 315/159; 307/10.8

(56) References Cited

U.S. PATENT DOCUMENTS 5,666,028 * 9/1997 Bechtel et al. ........................ 315/82

FOREIGN PATENT DOCUMENTS 2 559 282 A   9/1985  (FR) .
2 308 563 A   7/1997  (GB) .

* cited by examiner

Primary Examiner—David Vu
(74) Attorney, Agent, or Firm—Connolly Bove Lodge & Hutz

(57) ABSTRACT

Device for automatically operating the lights of a motor vehicle, comprising a central information-processing unit (1) for controlling on/off switching of the lights (7) of the vehicle, connected at input to a sensor (3) which senses the brightness in the vehicle's surroundings, a sensor (4) for sensing the speed of travel of the vehicle and a time base (5). This information-processing unit (1) is designed to compare various items of information about the brightness wits various thresholds so as to trigger the switching on/off of the lights of the vehicle according to the brightness conditions that this vehicle encounters.

17 Claims, 3 Drawing Sheets

METHOD AND DEVICE FOR AUTOMATICALLY OPERATING THE LIGHTS OF A MOTOR VEHICLE

FIELD OF THE INVENTION

The present invention relates to a method and to a device for automatically operating the lights of a motor vehicle.

More specifically, the invention relates to a method and to a device of this kind which allow the lights of a motor vehicle to be switched on and off automatically on the basis of information about the brightness in the surroundings of the vehicle, about the speed at which the vehicle is traveling and about the distance covered by the vehicle.

BACKGROUND OF THE INVENTION

There already exist within the prior art methods and devices of this type in which the level of instantaneous brightness in the vehicle's surroundings is used to trigger the switching on/off of the lights of the vehicle, by comparing this level with predetermined thresholds.

However, it will be appreciated that doing this exhibits a certain number of drawbacks, because the operation of the lights may then be ill-suited to the driving conditions encountered by the vehicle.

SUMMARY OF THE INVENTION

It is an object of the invention to provide a method for automatically operating the lights of a motor vehicle on the basis of information about the brightness in the vehicle's surroundings, about the speed at which the vehicle is traveling and about the distance covered by this vehicle, in which:

with a view to switching the lights on, the level of instantaneous brightness in the vehicle's surroundings is compared with two thresholds—respectively a high threshold N1 and a low threshold N2—so that, if the level of instantaneous brightness becomes and remains lower than the low threshold N2, and if the level of instantaneous brightness crosses the two thresholds in a time less than or equal to T2, the vehicle lights are immediately switched on if the vehicle speed is zero, the vehicle lights are switched on after a distance D1 has been covered if the vehicle speed is higher than or equal to a first speed threshold, the vehicle lights are switched on after a distance D2 covered if the vehicle speed is below the first speed threshold or the vehicle lights are switched on after a maximum period of time T13, after the level of instantaneous brightness has crossed the low threshold N2, if the level of instantaneous brightness crosses the two thresholds in a time of between T2 and T12, the vehicle lights are switched on after the period of time T13 after the level of instantaneous brightness has crossed the low threshold N2, and if, before the end of these time-metering or distance-metering operations, the level of instantaneous brightness crosses back above then below the low threshold N2, the vehicle lights are switched on after a period of time T17 after the level of instantaneous brightness has crossed the low threshold N2 for this further time.

Advantageously, with a view to switching the lights off, the level of instantaneous brightness in the vehicle's surroundings is compared with, respectively, a low threshold N3 and a high threshold N4 so that, if the level of instantaneous brightness becomes and remains higher than the high threshold N4, and if the level of instantaneous brightness crosses the two thresholds in a time less than or equal to T4 and if the vehicle speed is higher than or equal to a second speed threshold, the vehicle lights are switched off after a period of time equal to T5, and if the vehicle speed is below the second speed threshold, the vehicle lights are switched oft after a period of time T6 after the level of instantaneous brightness has crossed the high threshold N4, if the level of instantaneous brightness crosses the two thresholds in a time of between T4 and T14, the vehicle lights are switched off after a period of time T15 after the level of instantaneous brightness has crossed the high threshold N4, and if, before the end of these metering operations, the level of instantaneous brightness crosses back below then above the high threshold N4, the vehicle lights are switched off after a period of time corresponding to T5, T6 or T15 as defined previously after the level of instantaneous brightness has crossed the high threshold N4 for this further time.

According to another aspect, another subject of the invention is a device or implementing this method.

BRIEF DESCRIPTION OF THE DRAWINGS

The invention will be better understood from the description that will follow, which is given merely by way of example and with reference to the appended drawings, in which:

FIG. 4 illustrates the processing of the values of instantaneous brightness in the vehicle's surroundings so as to switch the vehicle's lights on.

DESCRIPTION OF THE PREFERRED EMBODIMENT

Figure 1:
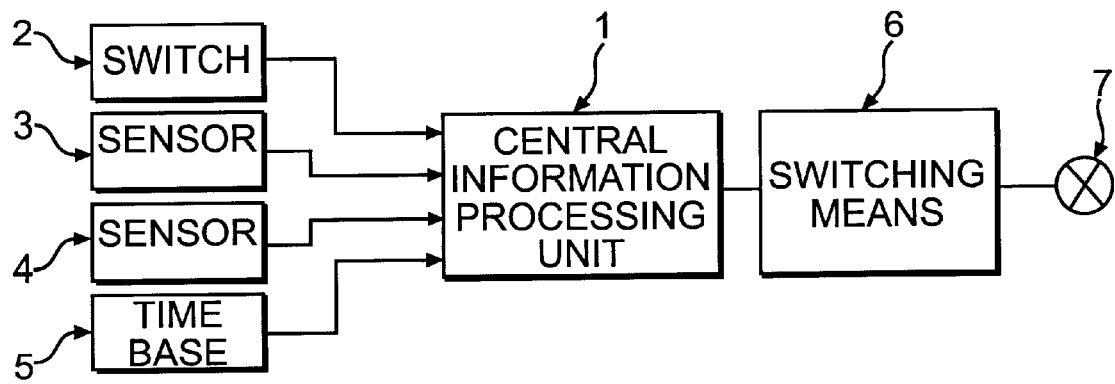
FIG. 1 depicts a block diagram illustrating one embodiment of an operating device according to the invention.

FIG. 1 depicts a device for automatically operating the lights of a motor vehicle.

This device comprises a central information-processing unit 1, connected at input to various members including a vehicle instrument combination switch 2 which can be operated by the driver of the vehicle, a sensor 3 which senses the instantaneous brightness in the vehicle's surroundings, a speed sensor 4 and a time base 5.

As will be described in greater detail hereinbelow, the central information-processing unit 1 is designed to analyze the information delivered by these various members and to control the operation of means 6 for switching the vehicle lights 7 on/off.

One of the tasks of the central unit 1 is to determine natural ambient brightness values on the basis of information relating to the instantaneous brightness in the vehicle's surroundings.

Figure 2:
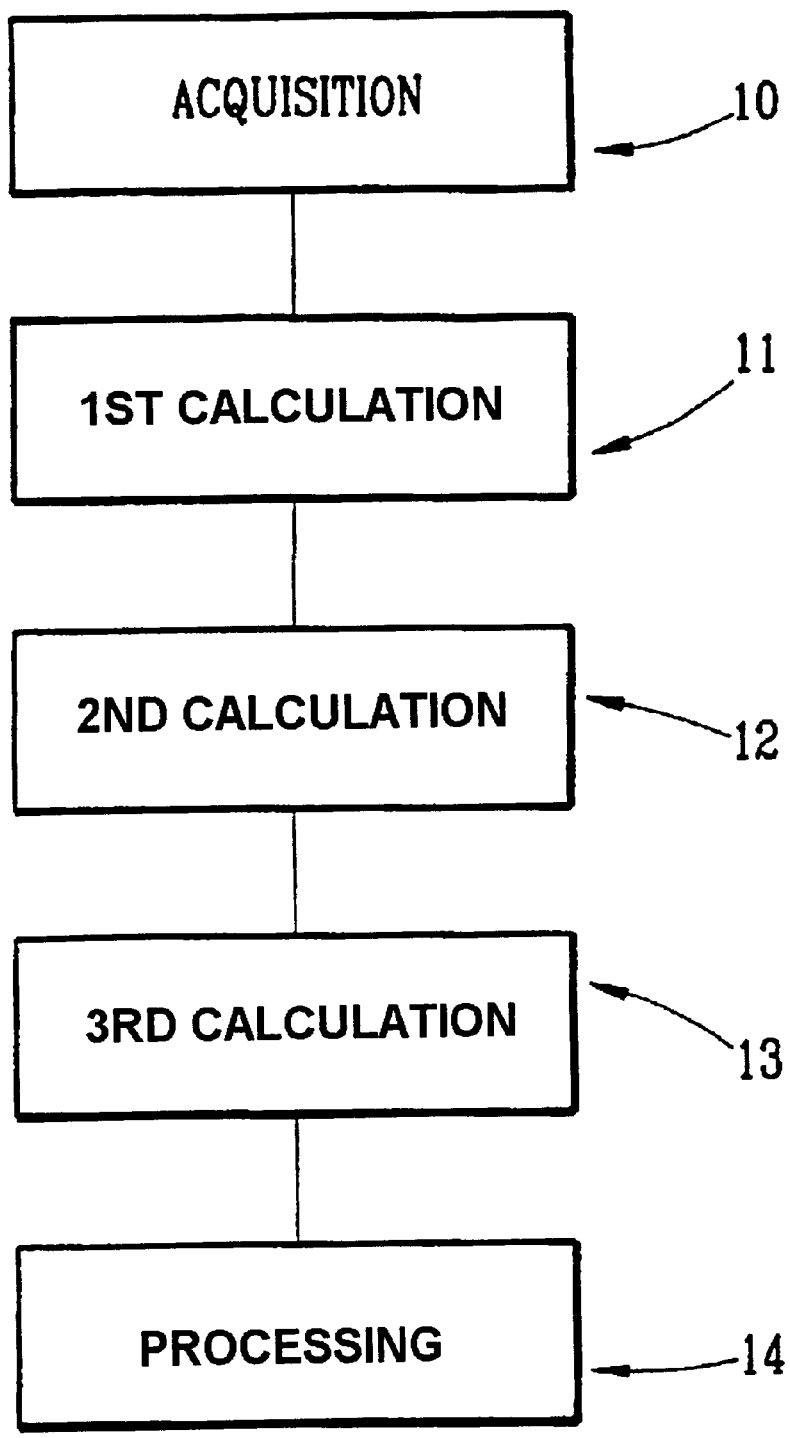
FIG. 2 depicts a flow chart illustrating the acquisition of instantaneous brightness information from the vehicle's surroundings and the processing of this information so as to determine values of natural ambient brightness in the vehicle's surroundings.

This is illustrated in FIG. 2, in which the various means for performing these various functions are illustrated in the form of blocks.

Thus, for example, this central information-processing unit comprises:

means 10 for periodically acquiring information about instantaneous brightness at output from the brightness sensor 3, for example every 200 milliseconds, means 11 for calculating immediate brightness values by calculating the mean, over a first period of time equal to about 1 s, of the instantaneous brightness values which lie in a first range of determined variation equal, for example, to 50 lux, means 12 for calculating immediate ambient brightness values by calculating the mean, over a second period of time equal to about 3 s, of the immediate brightness values which lie in a second range of determined variation, equal, for example, to about 50 lux.

means 13 for calculating natural ambient brightness values by calculating the mean of n first immediate ambient brightness values, n being equal to 10 for example, lying in a third range of determined variation, equal, for example, to 50 lux, over a third maximum period of time equal, for example, to about 60 s, and means 14 for processing these natural ambient brightness values to trigger the switching on/off of the vehicle lights.

Figure 3:
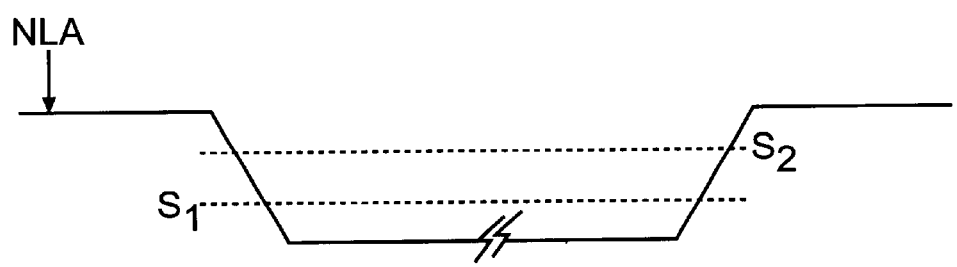
FIG. 3 illustrates the processing of these values of natural ambient brightness in the vehicle's surroundings so as to switch this vehicle's lights on and off.

This processing is illustrated in FIG. 3, where it can be seen that if the level of natural ambient brightness as calculated previously and denoted by the reference NLA becomes lower or equal to a threshold S1, for example 550 lux, the vehicle lights are immediately switched on.

Conversely, if the level of natural ambient brightness NLA becomes higher than a threshold S2 equal, for example, to 2700 lux, the vehicle lights are immediately switched off.

It can also be seen that if the level of instantaneous brightness at output from the sensor 3 is below this threshold S1 when the system is switched on, the vehicle lights are also switched on immediately.

In this case, if the level of instantaneous brightness remains below this threshold S1 for at least one period of time T16 equal for example to 30 min, and if the vehicle speed during this period of time T16 at least once becomes non-zero, then it must be assumed that this is a situation for lighting up at dusk.

If not, then it must be considered that this is a case of lighting up in a car park or in a tunnel.

It must also be noted that when the vehicle lights are switched on under these conditions, if the "+engine running" information disappears, that is to say if the engine stalls, for example, the lights must not be switched off.

If the level of instantaneous brightness in the vehicle's surroundings at output from the sensor 3 remains higher than the threshold S2 for a time T3 equal for example to 60 s, then the lights should also be switched off.

It will thus be appreciated that this structure allows the vehicle lights to be switched on/off on the basis of information corresponding to dusk and dawn.

Under conditions such as these, the variations in the level of brightness are relatively slow.

However, there are situations in which these variations are relatively quick, such as, for example, when the vehicle passes under a bridge, through a tunnel or enters a car park.

In this case, the level of instantaneous brightness in the vehicle's surroundings and the way this brightness varies need to be analyzed.

Figure 4:
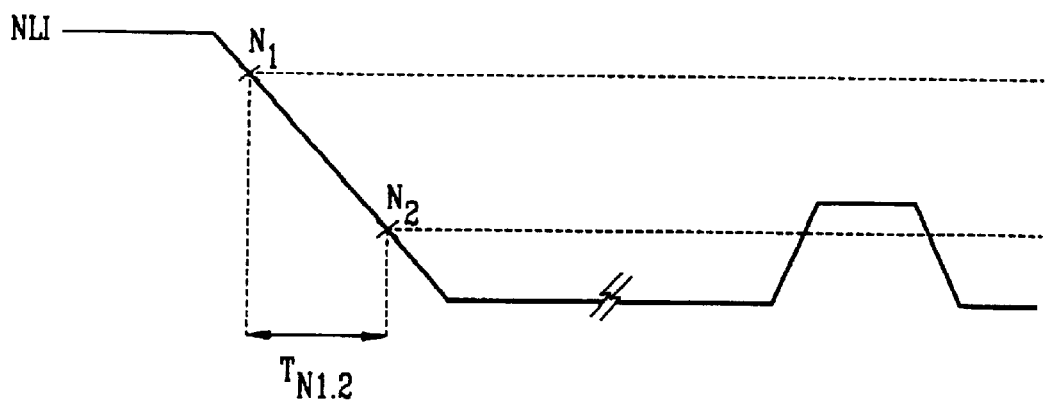

FIG. 4 depicts an example of the processing of the level of instantaneous brightness for switching the lights on.

Thus, according to FIG. 4, to trigger the switching on of the lights, the level of instantaneous brightness NLI in the vehicle's surroundings is compared with a high threshold Ni and with a low threshold N2.

These thresholds may, for example, be fixed or may be determined on the basis of the mean level of brightness Nm calculated from various levels described previously.

Thus, N1 may be determined on the basis of the values of the levels of natural ambient brightness NLA by subtracting from these a predetermined value $\Delta$ such as 50 lux for example, with a maximum limiting value equal, for example, to 1700 lux.

It is therefore appreciated that:

if NLA>Nm then N1=Nm, if S1<NLA≦Nm then N1=NLA−$\Delta$ with Nm=1700 lux, N2=450 lux and $\Delta$=50 lux.

if the level of instantaneous brightness crosses these two thresholds Ni and N2 in a time TN1.2 less than or equal to T2, that is to say, for example, 3 s, the vehicle lights are immediately switched on if the vehicle speed is zero.

By contrast, if the vehicle speed is not zero but 20 is below a first speed threshold, for example equal to 20 km/h, the vehicle lights are switched on after a distance D2 has been covered, that is to say after, for example, five meters have been covered, whereas if the vehicle speed is higher than or equal to this first speed threshold of, for example, 20 km/h, the vehicle lights are switched on after a distance D1 has been covered, that is to say after, for example, 60 m have been covered.

In any event, the vehicle lights are switched on after a maximum period of time T13 equal, for example, to 10 s if the level of instantaneous brightness NLI remains below the low threshold N2.

If the level of instantaneous brightness crosses these two thresholds N1 and N2 in a time TN1.2 of between T2, i.e., 3 s, and T12, i.e., for example, 30 s, the vehicle lights are switched on after the period of time T13, for example of 10 s, if the level of instantaneous brightness NLI remains below the low threshold N2.

Finally, if, before the end of these time-metering or distance-metering operations, the level of instantaneous brightness NLI crosses back above then below the low threshold N2, the vehicle lights are switched on after a period of time Tl7 of, for example, 10 s, if the level of instantaneous brightness NLI remains below the low threshold N2.

It will therefore be appreciated that this makes it possible, for example, to detect the fact that the vehicle is passing under a bridge in order to avoid any inappropriate switching on or the vehicle lights.

Specifically, if the level of instantaneous brightness NLI crosses back above the threshold N2 before the distance D1 or D2 has been covered, or before the end of the period of time T13, and if this level does not cross back below this threshold N2, then it is considered that the vehicle has passed under a bridge and no instruction to switch the lights on is given.

By contrast, if the level of brightness remains below the threshold N2 after the distance D1 or D2 has been covered, then it is determined that the situation is one of a tunnel, and an instruction to immediately switch the lights on is given.

In the event of a gradual decrease in the level of brightness, taken into consideration only if the vehicle speed is higher than or equal to the first speed threshold of, for example, 20 km/h, the vehicle lights are switched on after the period of time T13.

If the level of instantaneous brightness NLI passes above the threshold N2 and passes back below this threshold N2 before the distance Di or D2 has been covered, or before the end of the period of time T13, then a new period of time 17 is begun from the time the brightness drops below the threshold N2.

During this period of time T17, if the level of instantaneous brightness remains below this threshold N2, then an instruction to switch the vehicle lights on is given, at the end of this period of time.

This then corresponds to the vehicle passing into a tunnel with a well of daylight, as illustrated in FIG. 4.

If the speed of the vehicle is strictly between zero and the first speed threshold of, for example, 20 km/h, and if the level of brightness has remained below the threshold N2, then it is considered that the vehicle is driving around a parking lot and an instruction to switch the vehicle lights on is given after the vehicle has covered a distance equal to D2.

If the speed of the vehicle becomes zero before the distance D1 has been covered, and if the level of brightness is below the threshold N2, then an instruction to immediately switch the lights on is also given.

If the level of brightness is below N2, it is therefore accepted for the vehicle lights to be switched on under a bridge if the vehicle has remained stationary under this bridge, which may occur, for example, when the vehicle is stuck in traffic or entering an unlit garage.

Figure 5:
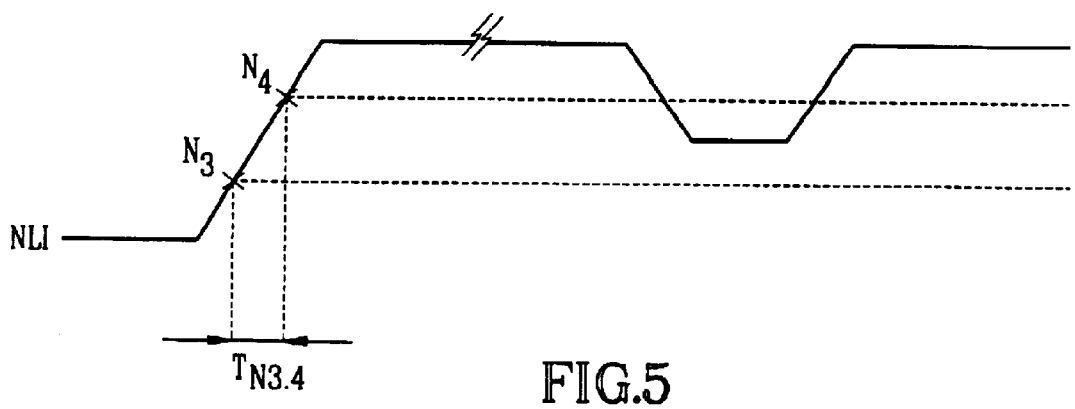
FIG. 5 illustrates the processing of the values of instantaneous brightness in the vehicle's surroundings 5 so as to switch the vehicle's lights off.

The instruction to switch the lights off is illustrated in FIG. 5.

To this end, the level of instantaneous brightness NLI in the vehicle's surroundings is compared with a low threshold N3 and with a high threshold N4.

These thresholds N3 and N4 can be determined in the same way as the thresholds Ni and N2 mentioned earlier.

Thus, for example, the threshold N3 may be equal to 450 lux, while the threshold N4 may be determined on the basis of the values of natural ambient brightness NLA by subtracting from these a predetermined value $\Delta$ equal, for example, to 50 lux.

Thus, if NLA is above NM (mean level of brightness before entering the tunnel), then N4 is equal to NM.

However, if NLA is between S1 and NM, then N4=NLA–$\Delta$, with $\Delta$=50 lux.

If the two brightness level thresholds are crossed in a time TN3.4 less than or equal to T4, for example of 3 s, and if the vehicle speed is higher than or equal to a second speed threshold also equal, for example, to 20 km/h, the vehicle lights are switched off after a period of time equal to T5, for example equal to 5 s.

If the vehicle speed is below the second speed threshold of 20 km/h, the vehicle lights are switched off after a second period of time T6 equal, for example, to 10 s.

These periods of time TS and T6 are calculated after the level of instantaneous brightness crosses the high threshold N4.

By contrast, if the level of instantaneous brightness crosses the two thresholds in a time of between T4, for example 3 s, and T14, for example 30 s, then the vehicle lights are switched off after a period of time T15 of, for example, 10 s, if the level of instantaneous brightness NLI remains higher than the high threshold N4.

If, before the end of these metering operations, the level of instantaneous brightness NLI crosses back below then above the high threshold N4, the vehicle lights are switched off after a period of time corresponding to T5, T6 or T15 as determined previously, if the level of instantaneous brightness NLI remains higher than the high threshold N4.

It will thus be appreciated that this makes it possible to trigger the switching off of the lights for example when exiting a tunnel or an insufficiently lit parking lot even if the vehicle passes temporarily through darkness having exited this tunnel or this parking lot.

Furthermore, if the lights have been switched on as a result of the system being switched on in a parking lot or a tunnel (NLI<S1) and if the level of instantaneous brightness remains higher than the level N3, then the passage, on exiting the tunnel, to a level of instantaneous brightness higher than N4 also causes the lights to be switched off after the period of time T5 or T6 determined according to the speed of the vehicle.

When the vehicle ignition is switched off, if the level of instantaneous brightness is below the low threshold S1, then the vehicle lights are switched on for a period of time T11 equal, for example, to 45 s after the ignition has been switched off or after the driver's door has closed, if this door was opened before the end of this period of time T11.

This then allows the vehicle lights to be kept on for the time taken to maneuver outside the vehicle, in a parking area in which the vehicle is not locked.

The vehicle is then considered to be stationary with the engine switched off.

It will be appreciated that this method and this device make it possible automatically to switch the lights of a motor vehicle on and off in an optimized fashion in order to improve vehicle driving safety.

What is claimed is:

1. A method for automatically operating the lights of a motor vehicle on the basis of information about the brightness in the vehicle's surroundings, about the speed at which the vehicle is traveling and about the distance covered by this vehicle, including the steps of, with a view to switching the lights on, comparing the level of instantaneous brightness (NLI) in the vehicle's surroundings with two thresholds—respectively a high threshold N1 and a low threshold N2—so that, if the level of instantaneous brightness becomes and remains lower than the low threshold N2, and if the level of instantaneous brightness crosses the two thresholds in a time (TN1.2) less than or equal to T2, immediately switching on the vehicle lights if the vehicle speed is zero, switching on the vehicle lights after a distance D1 has been covered if the vehicle speed is higher than or equal to a first speed threshold, switching on the vehicle lights after a distance D2 covered if the vehicle speed is below the first speed threshold, after the level of instantaneous brightness has crossed the low threshold N2, if the level of instantaneous brightness crosses the two thresholds in a time of between T2 and T12, switching on the vehicle lights after the period of time T13 after the level of instantaneous brightness has crossed the low threshold N2, and if, before the end of these time-metering or distance-metering operations, the level of instantaneous brightness crosses back above then below the low threshold N2, switching on the vehicle lights after a period of time T17 after the level of instantaneous brightness has crossed the low threshold N2 for this further time.

2. Method according to claim 1, including the steps of, with a view to switching the lights off comparing the level of instantaneous brightness (NLI) in the vehicle's surroundings with, respectively, a low threshold N3 and a high threshold N4 so that, if the level of instantaneous brightness becomes and remains higher than the high threshold N4, and if the level of instantaneous brightness crosses the two thresholds in a time (TN3.4) less than or equal to T4 and if the vehicle speed is higher than or equal to a second speed threshold, switching off the vehicle lights after a period of time equal to T5, and if the vehicle speed is below the second speed threshold, switching off the vehicle lights after a period of time T6 after the level of instantaneous brightness has crossed the high threshold N4, if the level of instantaneous brightness crosses the two thresholds in a time of between T4 and T14, switching off the vehicle lights after a period of time T15 after the level of instantaneous brightness has crossed the high threshold N4, and if, before the end of these metering operations, the level of instantaneous brightness crosses back below then above the high threshold N4, switching off the vehicle lights after a period of time corresponding to T5, T6 or T15 as defined previously after the level of instantaneous brightness has crossed the high threshold N4 for this further time.

3. The method according to claim 1, including the step of, when the vehicle speed becomes zero and when the level of instantaneous brightness is below the low threshold N2 when the distance D1 or D2 has not yet been covered, switching on the vehicle lights.

4. The method according to claim 2, including the step of, on start-up, if the level of instantaneous brightness (NLI) is below a low threshold S1 and crosses the high threshold N4 without having crossed the low threshold N3, switching off the vehicle lights after a period of time T5 or T6 if the vehicle speed is, respectively, higher than/equal to or lower than a third speed threshold.

5. The method according to claim 1, including the steps of, when the vehicle ignition is switched off, if the level of instantaneous brightness (NLI) is below a low threshold S1, switching on the vehicle lights for a period of time T11 after the ignition is switched off or after the driver's door closes, if this door had been opened before the end of this period of time T11.

6. The method according to claim 1, including the steps of, periodically acquiring information about the instantaneous brightness (NLI) at output from a brightness sensor associated with the vehicle (at 10), calculating immediate brightness values (at 11) by calculating the mean, over a first period of time, of the instantaneous brightness values which lie in a first range of determined variation, calculating immediate ambient brightness values (at 12) by calculating the mean, over a second period of time, of the immediate brightness values which lie in a second range of determined variation, calculating natural ambient brightness (NLA) values (at 13) by calculating the mean of n first immediate ambient brightness values which lie in a third range of determined variation, over a third maximum period of time, and determining the high thresholds N1 and N4 from these natural ambient brightness (NLA) values.

7. The method according to claim 6, wherein the first, second and third ranges of determined variation are equal to 50 lux.

8. The method according to claim 6, wherein n is equal to 10.

9. The method according to claim 6, wherein the instantaneous brightness information is acquired approximately every 200 ms.

10. The method according to claim 6, wherein the first period of time is equal to about one second.

11. The method according to claim 6, wherein the second period of time is equal to about three seconds.

12. The method according to claim 6, where in the third period of time is equal to about 60 seconds.

13. The method according to claim 5 including the step of comparing the level of natural ambient brightness (NLA) with the low threshold S1 and with a high threshold S2 to trigger the switching on of the vehicle lights if this level is below or equal to the threshold S1 and the switching off of the vehicle lights if the level is higher than or equal to the high threshold S2.

14. The method according to claim 1, wherein the two low thresholds N2 and N3 are equal to 450 lux, T2=3 s, D1=60 m, the first speed threshold is equal to 20 km/h, D2=5 m, T13=10 s, T12=30 s, T17=10 s, T4=3 s, the second speed threshold is equal to 20 km/h, T5=5 s, T6=10 s, T14=40 s, T15=10 s, S1=550 lux, T11=45 s, S2=2700 lux and the third speed threshold is equal to 20 km/h.

15. The method according to claim 1, wherein the high thresholds N1 and N4 are variable and determined on the basis of natural ambient brightness (NLA) values by subtracting from these values a predetermined value ($\Delta$), with a maximum limiting value (Nm) and a minimum lifting value (S1).

16. The method according to claim 15, wherein the predetermined value ($\Delta$) is equal to 50 lux, the maximum limiting value is equal to 1700 lux, and the minimum limiting value is equal to 550 lux.

17. A device for automatically operating the lights of a motor vehicle for implementing the method according to claim 1, said device comprising a central information-processing unit for controlling the operation of means for switching the lights of the vehicle on/off, connected at input to a sensor which senses the brightness in the vehicle's surroundings, a vehicle-speed sensor and a time base.

* * * * *